(12) United States Patent
Okubo et al.

(10) Patent No.: US 6,298,199 B1
(45) Date of Patent: Oct. 2, 2001

(54) ELECTRIC CIRCUITS FOR CAMERA

(75) Inventors: Mitsumasa Okubo, Hino; Osamu Nonaka, Sagamihara, both of (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

(21) Appl. No.: 09/590,220

(22) Filed: Jun. 8, 2000

(30) Foreign Application Priority Data

Jun. 9, 1999 (JP) .................................................. 11-162431

(51) Int. Cl.[7] .............................. G03B 3/00; G03B 17/18
(52) U.S. Cl. ........................................... 396/97; 396/287
(58) Field of Search .......................... 396/97, 231, 228, 396/229, 230, 287, 288, 289, 290, 291, 292

(56) References Cited

U.S. PATENT DOCUMENTS 4,668,069 * 5/1987 Hasegawa ............................. 396/231
4,820,023 * 4/1989 Ohsawa ................................ 396/301
5,124,738 * 6/1992 Yamashita ............................. 355/56
5,162,836 * 11/1992 Ishimaru ............................... 396/231
5,412,448 * 5/1995 Kunushige ............................ 396/97
5,614,983 * 3/1997 Iwane et al. .......................... 396/97

FOREIGN PATENT DOCUMENTS 58-27004   2/1983   (JP) .
5-61443    3/1993   (JP) .
11-95274   4/1999   (JP) .

* cited by examiner

*Primary Examiner*—Russell Adams
*Assistant Examiner*—Arthur A. Smith
(74) *Attorney, Agent, or Firm*—Frishauf, Holtz, Goodman, Langer & Chick, P.C.

(57) ABSTRACT

An electric circuit for a camera of this invention performs stable camera control with a simple structure and does not depend on a change in environment, such as temperature. The electric circuit for a camera has an IFIC capable of outputting signals with a plurality of temperature characteristics, and a CPU. The CPU selectively receives the output signals with the plurality of temperature characteristics. An output signal is formed based on this selected input signal and a digital signal computed by the CPU.

11 Claims, 8 Drawing Sheets

| OPERATION MODE | | ORIGINAL VOLTAGE OF OUTPUT VOLTAGE OF BUFFER 24 | TEMPERATURE CHARACTERISTIC |
|---|---|---|---|
| LCD DISPLAY ALONE | | $V_{BE}/R$ VOLTAGE SUPPLY | NEGATIVE |
| WHEN REMOTE CONTROL CIRCUIT IS IN OPERATION | | $V_{BE}/R$ VOLTAGE SUPPLY | NEGATIVE |
| AT TIME OF A/D CONVERSION | LIGHT METERING CIRCUIT IN IC | T PROPORTIONAL VOLTAGE SUPPLY | POSITIVE |
| | TEMPERATURE MEASURING BATTERY CHECK CIRCUIT BLUR SENSOR CIRCUIT | T TABLE VOLTAGE SUPPLY | NO TEMPERATURE CHARACTERISTIC |
| WHEN MOTOR IS DRIVEN | | THERMISTOR | ARBITRARY (NEGATIVE HERE) |
| AT TIME OF MEASURING LIGHT WITH Cds | | VOLTAGE SUPPLY | ARBITRARY (NEGATIVE HERE) |

FIG. 11

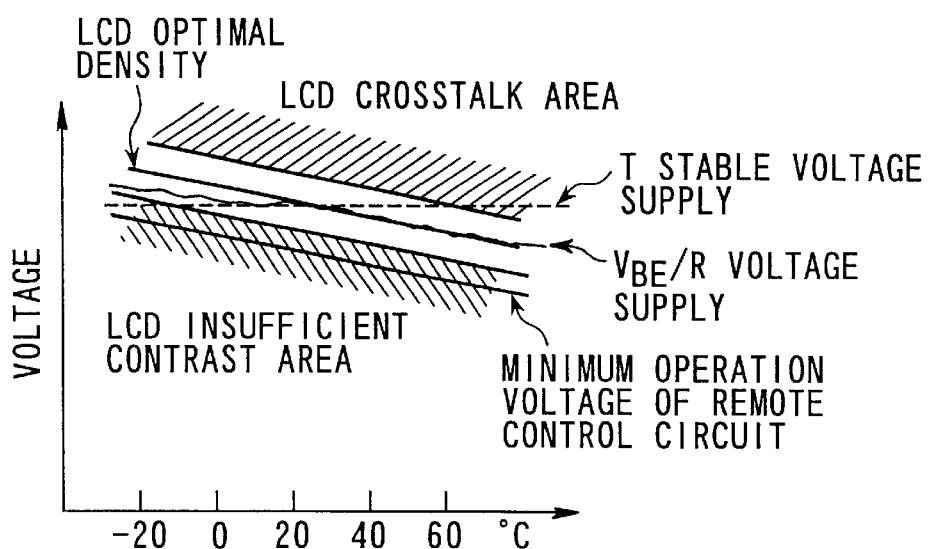

FIG. 12

ELECTRIC CIRCUITS FOR CAMERA

CROSS-REFERENCE TO RELATED APPLICATIONS

This application is based upon and claims the benefit of priority from the prior Japanese Patent Application No. 11-162431, filed on Jun. 9, 1999, the entire contents of which are incorporated herein by reference.

BACKGROUND OF THE INVENTION

The present invention relates to an electric circuit for a camera, and, more particularly, to an electric circuit for a camera which is invulnerable to the influence of a change in environment, such as temperature.

Recently, the electric circuit for a camera uses various components. Due to the following reasons, there is a growing demand that the influence of the temperature on sensors, actuators and a display unit, which are included in a camera, should be reduced as much as possible.

For example, if the focusing/light measuring properties of sensors have a temperature dependency, insufficient exposure and out-of-focusing occur at a low temperature. Unless the outputs of the actuators are controlled properly, out-of-focusing of the lens, a variation between frames of a film and a mis-selection of gears would occur and the mechanisms may be damaged or malfunction in some cases. Further, the display unit, particularly, an LCD display unit, suffers from insufficient light display at a low temperature and is likely to have crosstalking at a high temperature.

Many of recent cameras have a D/A converter built in a one-chip microcomputer.

For example, Jpn. Pat. Appln. KOKAI Publication No. 9-258606 filed earlier by the assignee of the present application describes a scheme of detecting a blur using a blur sensor and a CPU which incorporates a D/A converter.

Jpn. Pat. Appln. KOKAI Publication No. 58-27004 describes the technique that provides the reference voltage of an A/D converter with a temperature characteristic to compensate for the temperature of a compression diode for AF.

Further, Jpn. Pat. Appln. KOKAI Publication No. 5-61443 discloses the technique that uses a CPU for display compensation.

Although the aforementioned Jpn. Pat. Appln. KOKAI Publication No. 9-258606 describes the technique of processing a blur with a CPU equipped with a D/A converter, it fails to describe compensation for a temperature dependency.

While the technique described in the aforementioned Jpn. Pat. Appln. KOKAI Publication No. 58-27004 corrects the temperature of the compression diode for AF, the correction is done at the time of A/D conversion and analog-based correction is not possible so that delicate signals cannot be corrected sufficiently. Although the aforementioned Jpn. Pat. Appln. KOKAI Publication No. 5-61443 uses a CPU for display compensation, it is not a D/A converter in a one-chip microcomputer so that the circuit is complicated, making it difficult to carry out various compensations with a simple structure.

BRIEF SUMMARY OF THE INVENTION

Accordingly, it is an object of the present invention to provide an electric circuit for a camera, which can perform stable camera control with a simple structure and does not depend on a change in environment, such as temperature.

It is a first object of this invention to provide an electric circuit for a camera having an integrated circuit capable of outputting signals of a plurality of different temperature characteristics and a microcomputer, characterized in that the microcomputer selectively receives the signals of the plurality of different temperature characteristics and forms an output signal based on the selected input signal and a digital signal computed by the microcomputer.

It is a second object of this invention to provide an electric circuit for a camera comprising:

a microcomputer including an A/D converter section, a D/A converter section and an operation control section;

at least one module operative in response to an instruction from the microcomputer and having a temperature dependency;

monitor means for outputting an analog signal corresponding to the temperature dependency of the at least one module; and storage means for storing a correlation between an operation of the at least one module and the analog signal, whereby the microcomputer sets data to be given to the D/A converter section in accordance with a value obtained by digital conversion of the analog signal by the A/D converter section and data stored in the storage means.

It is a third object of this invention to provide an electric circuit for a camera comprising:

a microcomputer including a D/A converter section capable of receiving a reference voltage from an external unit, and an operation control section;

a plurality of modules operative based on an instruction from the microcomputer and having a temperature dependency; and reference-voltage supply means for supplying reference voltages having a plurality of temperature characteristics to the D/A converter section in the microcomputer, whereby the microcomputer allows the reference-voltage supply means to supply a reference voltage having one of the temperature characteristics, in accordance with data stored in a storage means, and generates a predetermined output signal using the reference voltage.

It is a fourth object of this invention to provide an electric circuit for a camera comprising:

a microcomputer including an A/D converter section, a D/A converter section and an operation control section; and a reference-voltage outputting circuit operative in response to an instruction from the microcomputer to supply a reference voltage to the A/D converter section and the D/A converter section via a single common signal line, whereby the microcomputer switches a temperature characteristic of the reference voltage between a case where the A/D converter section is used and a case where the D/A converter section is used.

It is a fifth object of this invention to provide an electric circuit for a camera comprising:

a microcomputer including an operation control section, an LCD driver for converting an externally supplied reference voltage to drive a liquid crystal panel and a D/A converter section operative in response to the externally supplied reference voltage and an output of the operation control section; and a reference-voltage outputting circuit for supplying a reference voltage to the LCD driver and the D/A converter section via a single common signal line.

It is a sixth object of this invention to provide an electric circuit for a camera comprising:

a microcomputer including an operation control section, an LCD driver for internally converting an externally supplied reference voltage to drive a liquid crystal panel and an A/D converter section operative in response to the externally supplied reference voltage; and a reference-voltage outputting circuit for supplying a reference voltage to the LCD driver and the A/D converter section via a single common signal line, whereby the microcomputer switches a temperature characteristic of the reference voltage between a case where the A/D converter section is operated and a case where the A/D converter section is not operated.

It is a seventh object of this invention to provide an electric circuit for a camera comprising:

a microcomputer including an operation control section, a D/A converter section operative based on an externally supplied reference voltage;

a remote control detection circuit for detecting a wireless remote control signal; and a reference-voltage outputting circuit for supplying a reference voltage for the D/A converter section and power for the remote control detection circuit via a single common signal line.

It is an eighth object of this invention to provide an electric circuit for a camera comprising:

a microcomputer including an operation control section and a D/A converter section;

a focusing circuit for generating an output having a temperature dependency; and a temperature measuring circuit, whereby the microcomputer sets an output of the D/A converter section in response to the temperature measuring circuit to thereby compensate for the temperature dependency of the focusing circuit.

It is the ninth object of this invention to provide an electric circuit for a camera comprising:

a blur sensor for detecting a blur state of the camera;

an amplifier for amplifying a signal from the blur sensor;

a microcomputer including an operation control section and a D/A converter section; and a reference-voltage outputting circuit for supplying a reference voltage via a common signal line to two or more of a voltage control circuit for controlling a drive voltage of an actuator of the camera based on an output of the D/A converter section, a blur detecting circuit for setting a reference level of the amplifier based on the output of the D/A converter section and a focusing circuit for setting an analog signal level to be used in a predetermined circuit in accordance with the output of the D/A converter section, whereby the microcomputer controls two or more of the voltage control circuit, the blur detecting circuit and the focusing circuit in a time-divisional manner.

It is the tenth object of this invention to provide an electric circuit for a camera comprising:

a microcomputer including an operation control section and a D/A converter section;

an analog circuit having a dependency on an environmental parameter, for executing various functions of the camera; and whereby the microcomputer sets an output of the D/A converter section based on the detected environmental parameter and providing the analog circuit with that analog output.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 11 is a diagram showing selection of an original voltage supply for the output voltage of a buffer 24 in the second embodiment; and FIG. 12 is a diagram exemplarily illustrating the voltage of a T stable voltage supply, the voltage of a $V_{BE}/R$ voltage supply, a LCD display characteristic and a minimum voltage for operating a remote control circuit.

DETAILED DESCRIPTION OF THE INVENTION

Preferred embodiments of the present invention will now be described with reference to the accompanying drawings.

Figure 1:
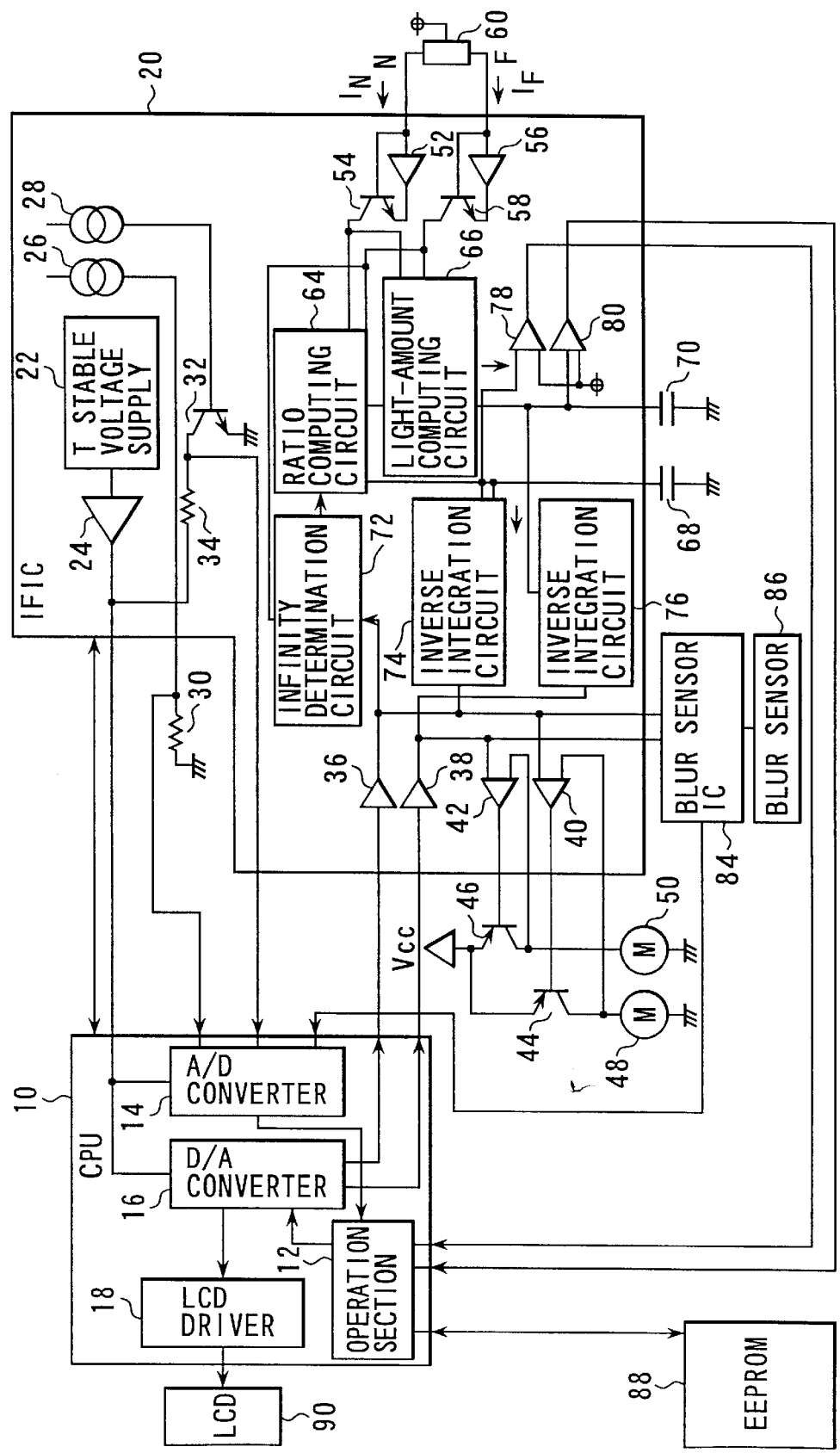
FIG. 1 is a structural diagram of an electric system of a camera, illustrating a first embodiment of this invention.

FIG. 1 is a structural diagram of an electric system of a camera, illustrating the first embodiment of this invention.

In FIG. 1, reference numeral 10 is a one-chip microcomputer (CPU) for controlling the general operation of the camera. Provided inside this CPU 10 are an operation section 12, an A/D converter 14, a D/A converter 16 and LCD driver 18.

Since the A/D converter 14 and D/A converter 16 are constructed by a combination of resistor elements which have relatively approximately the same temperature dependencies, the temperature dependency as a single unit is almost zero. The LCD driver 18 divides a reference voltage output from the D/A converter 16 into three to form a drive voltage.

Connected to the CPU 10 is an interface IC (IFIC) 20 which performs individual analog controls needed for the camera.

In the IFIC 20, a constant voltage supply (T stable voltage supply) 22 which uses a band-gap voltage or the like and whose temperature dependency is approximately zero is connected to a buffer 24. This buffer 24 drops the impedance of the output voltage of the T stable voltage supply 22 and sends it out.

A current source 26 is externally connected to, for example, the T stable voltage supply 22 and comprises resistor elements or the like whose temperature dependencies are approximately zero and amplifies the current. This flow into a thermistor 30 having one end grounded, and a voltage at the other end to the grounded end varies as the resistance of the thermistor 30 changes due to a change in temperature.

An I/R proportional current source 28 is formed by connecting a resistor element in the chip to a constant voltage. A current from this I/R proportional current source 28 flows into the base of an NPN transistor 32 to drive a resistor element 34 provided between the collector of the transistor 32 and the output of the buffer 24. The current which is the current of the I/R proportional current source 28 multiplied by $H_{FE}$ flows across the resistor 34, causing a voltage drop.

The voltage drop across the resistor 34 is proportional to $H_{FE}$ of the NPN transistor 32. The temperature characteristic of the NPN transistor 32 other than the temperature characteristic of $H_{FE}$ is canceled out. Note that the NPN transistor 32 has the same shape as, is laid out in the same direction as and is located in the vicinity of NPN transistors 54 and 58 in a focusing circuit to be described later.

Upon reception of the output of the D/A converter 16 in the CPU 10, buffers 36 and 38 in the IFIC 20 drop the impedance and supplies the output to the individual sections in the IFIC 20.

Operational amplifiers 40 and 42 for driving motors with a constant voltage have their outputs respectively connected to the bases of power transistors 44 and 46 and have one input ends connected to the buffers 36 and 38 and other input ends connected to the collectors of the power transistors 44 and 46. At the time of operating in response to the CPU 10, the operational amplifiers drive motors 48 and 50 with a constant voltage based on the output voltage of the D/A converter 16.

A blur sensor 86 which detects blurring is connected to the CPU 10 and IFIC 20 via a blur sensor IC 84 which performs signal processing. The details of the blur sensor 86 and the signal processing circuit in the IC are the same as described in Jpn. Pat. Appln. KOKAI Publication No. 9-258606 filed earlier by the assignee of the present application, their description will be omitted, but it is to be noted that the output initial potential of this blur sensor in use has, for example, a temperature dependency. The amplification reference level of an amplifier in this blur sensor IC 84 can be set by the D/A converter 16 in the CPU 10. A non-volatile memory (EEPROM) 88 is connected to the operation section in the CPU 10. This EEPROM 88 is storing the correlation between data to be output from the D/A converter 16 and the resistor element 34 or the $H_{FE}$ monitor output (the potential between the resistor element 34 and the NPN transistor 32), in addition to various stored data for the camera.

Further, an LCD display unit 90 is connected to the LCD driver 18 in the CPU 10 so that the state of the camera and pickup information are displayed outside the camera or in the finder or the like. This LCD display unit 90 is driven by the LCD driver 18.

Setting of the D/A converter in the CPU 10 will now be discussed specifically.

Figure 2:
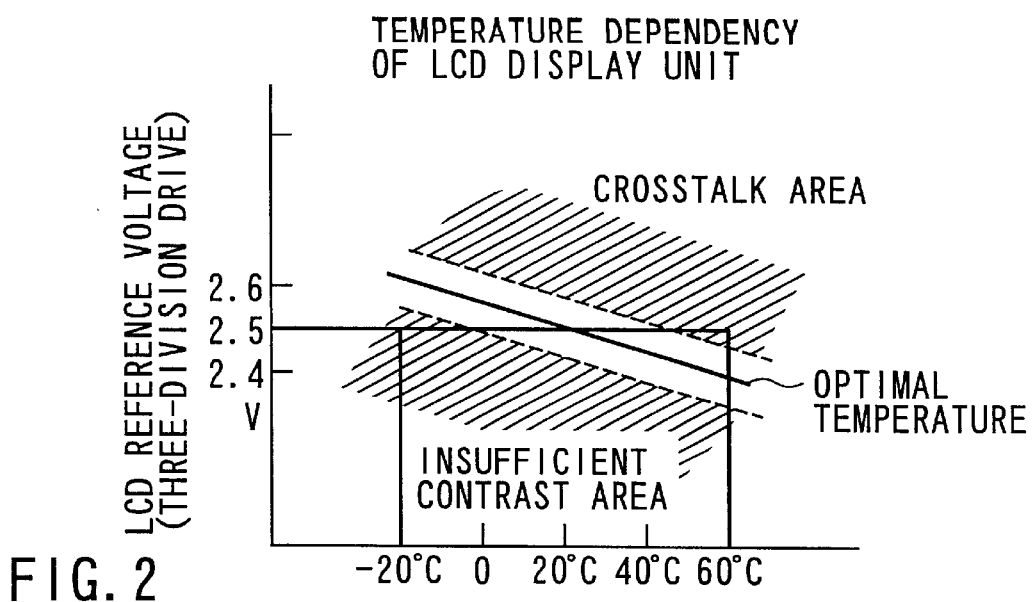
FIG. 2 is a characteristic diagram showing the relationship between a drive voltage dependency of an LCD display unit 90 and the temperature.

FIG. 2 is a characteristic diagram showing the relationship between the drive voltage dependency of the LCD display unit 90 and the temperature.

As driving an LCD generally becomes hard as the temperature becomes lower, the best line (optimal density line) which has a sufficient contrast and has no crosstalking between segments rises leftward as shown in FIG. 2. Parallel to that line are a line at which a crosstalk area starts and a line which has poor contrast, as illustrated.

Conventionally, the drive voltage of, for example, 2.5 V is set so as to present the optimal display at normal temperature. In this case, however, the LCD density becomes insufficient at or below 0° C. and crosstalk occurs at 50° C. In this respect, the optimal voltage is determined from the EEPROM 88 based on the voltage of the thermistor 30, and the optimal voltage is given as a reference voltage to the LCD driver 18 from the D/A converter 16, so that the optimal drive voltage can be applied regardless of the temperature.

An amplifier 52, an NPN transistor 54, an amplifier 56 and an NPN transistor 58 are connected to a PSD 60, and constitute a head amplifier for a light current to an AF circuit. The light current input from the PSD 60 is multiplied by $H_{FE}$ by the NPN transistors 54 and 58, respectively, and is output to a ratio computing circuit 64 and a light-amount computing circuit 66.

The ratio computing circuit 64 performs a ratio computation of the light current. A current proportional to $I_N/(I_P+I_N)$ is output to a ratio integration capacitor 68 connected externally. As this circuit 64 performs a ratio computation, $H_{FE}$ of the NPN transistors 54 and 58 may be canceled if the characteristics at both terminals are nearly identical.

As well known, an error is increased by noise as the light current values of $I_F$ and $I_N$ become smaller so that near distance data may be output at the time of focusing at a far distance where the light current value becomes small. Therefore, this ratio computing circuit 64 is provided with a circuit which forcibly clamps a ratio computation value to zero (an infinity value) when an infinity determination circuit 72 determines that $I_F$ is equal to or smaller than a predetermined value. This circuit performs infinity determination based on $I_F$ multiplied by $H_{FE}$, it depends on $H_{FE}$. Therefore, this infinity decision level can be set by the output of the D/A converter 16 in the CPU 10.

The light-amount computing circuit 66 computes the amount of light of the light current. This light-amount computing circuit 66 is designed in such a way that its output becomes $I_N*H_{FE}+I_F* H_{FE}$. A current proportional to the output is sent to a light-amount integration capacitor 70.

As the output of the light-amount computing circuit 66 is proportional to $H_{FE}$, it is influenced by a variation in $H_{FE}$.

Therefore, the inverse integration current value of an inverse integration circuit 76 which sets the inverse integration current of the integration capacitor 70 is determined by the output of the D/A converter 16. The inverse integration current value of an inverse integration circuit 74 of the ratio integration capacitor 68 which does not have an $H_{FE}$ dependency is fixed to a predetermined value.

Comparators 78 and 80 are circuits which compare the output of the ratio computing circuit 64 and the output of the light-amount computing circuit 66 with a predetermined values. They are activated after the potentials change from the initial voltages of the capacitors 68 and 70 which have been integrated once, and inverted outputs are sent out when the potentials are returned to the initial voltages by the inverse integration. The time from the beginning of this inverse integration to the inversion of the outputs of the comparators 78 and 80 is proportional to a change in the potentials of the ratio integration capacitor 68 and the light-amount integration capacitor 70 caused by the light current. Therefore, the ratio computation value/light-amount computation value is acquired as the CPU 10 counts the time.

Figure 3:
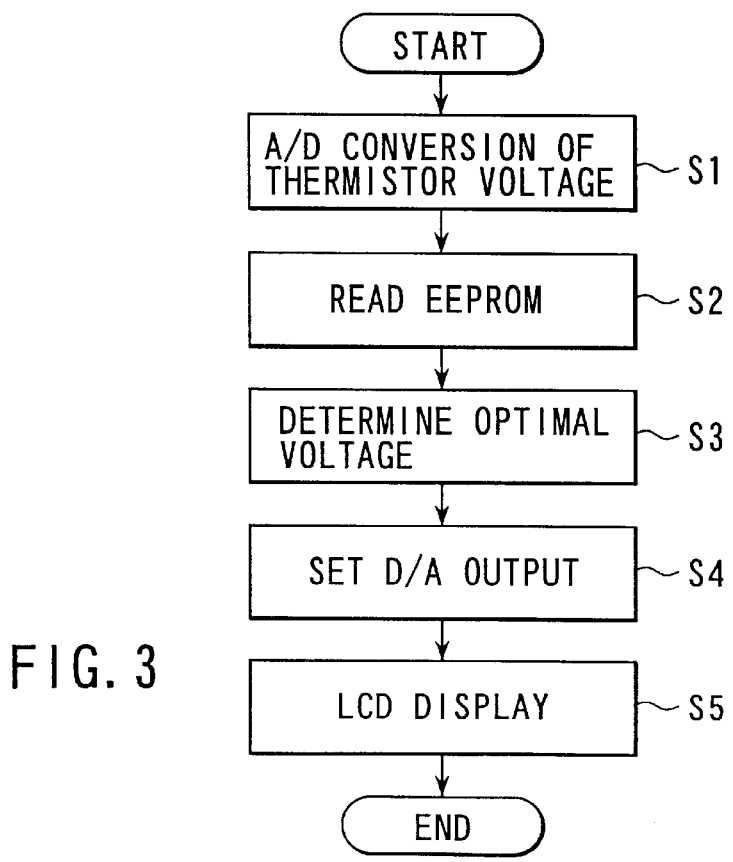
FIG. 3 is a flowchart for explaining the operation of a CPU 10 for driving an LCD.

FIG. 3 is a flowchart for explaining the operation of the CPU 10 for the aforementioned LCD driving.

First, the voltage of the thermistor 30 is subjected to A/D conversion by the A/D converter 14 in step S1. Next, its corresponding D/A value is read from the EEPROM 88 in step S2.

Then, the value of the EEPROM 88 is recognized as an optimal voltage in step S3, and a D/A output is set in step S4. Thereafter, the LCD driver is driven to present LCD display in step S5.

A detailed description will now be given of a method of canceling the temperature dependency of $H_{FE}$ of the NPN transistor in the IFIC 20 in the focusing circuit system by using the D/A converter 16 in the CPU 10.

Figure 4A:
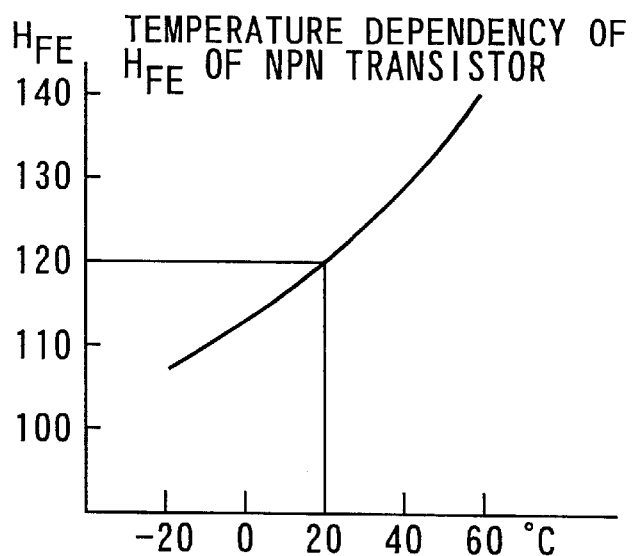
FIG. 4A is a characteristic diagram showing the temperature dependency of $H_{FE}$ of an NPN transistor in an IFIC 20.

FIG. 4A is a characteristic diagram showing the temperature dependency of $H_{FE}$, of the NPN transistor in the IFIC 20.

Figure 4B:
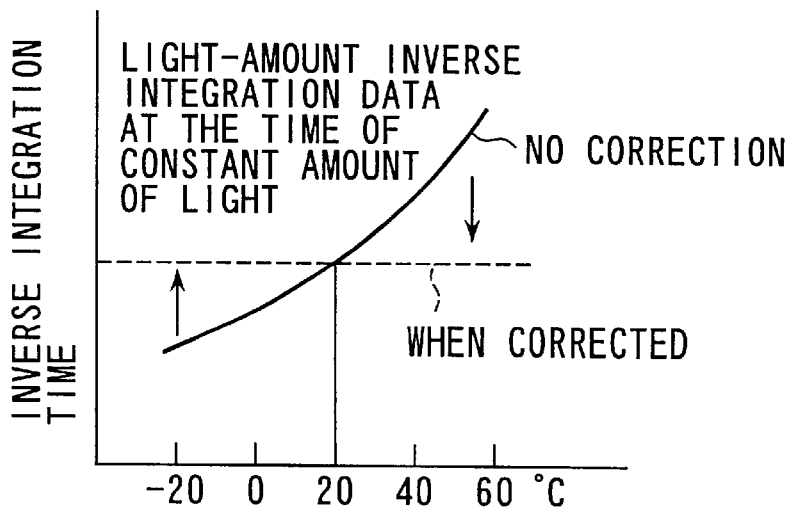
FIG. 4B is a temperature characteristic diagram of light-amount inverse integration data at the time at a constant amount of light.
Figure 4C:
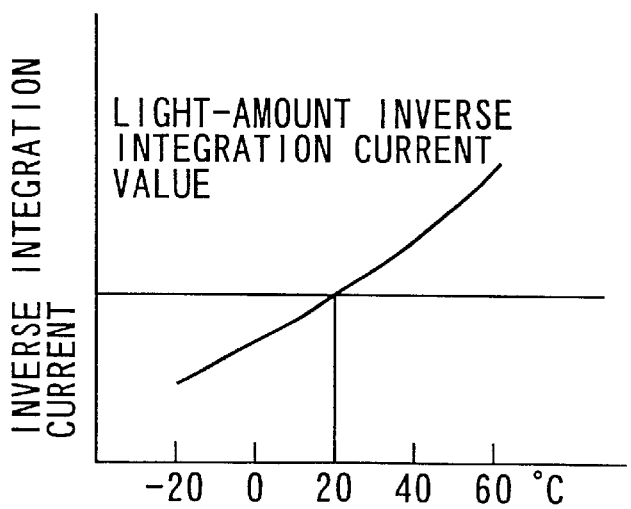
FIG. 4C is a temperature characteristic diagram of a light-amount inverse integration current value.

Generally speaking, $H_{FE}$ of a transistor becomes high at a high temperature and low at a low temperature. While the inverse integration current of the ratio computing circuit whose $H_{FE}$ is canceled can be constant, therefore, if the output of the light-amount integration capacitor 58 is inversely integrated with a constant current, the temperature dependency becomes nearly identical to the temperature dependency of $H_{FE}$ as shown in FIG. 4B. This causes the output computation distance to vary by the temperature, so that the inverse integration current of the light-amount integration capacitor, like $H_{FE}$, is given a temperature dependency as shown in FIG. 4C.

Figure 5:
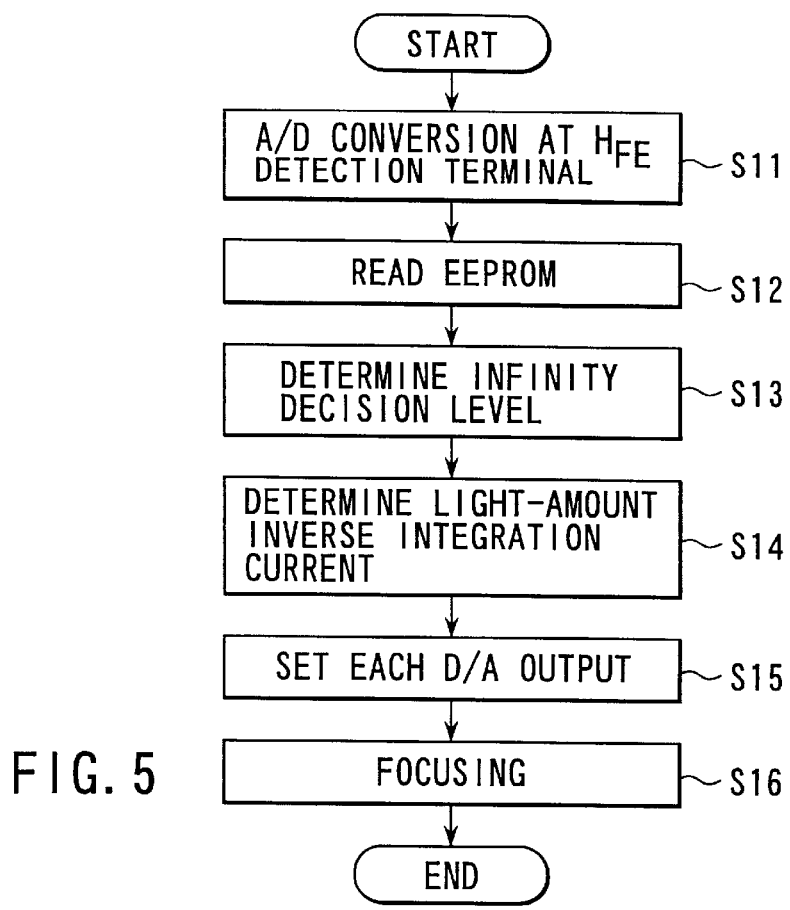
FIG. 5 is a flowchart for explaining the operation of the CPU 10 at the time of setting a D/A converter 16.

That is, the collector voltage of the NPN transistor 32 is subjected to A/D conversion by the A/D converter 14 and a change in $H_{FE}$ is detected based on this value. Then, the output of the D/A converter 16 is so set as to cancel the change, and the output of the inverse integration circuit 76 is determined by that output. The ratio integration infinity decision level is carried out in a similar manner. The operation of the CPU 10 at the time of setting the D/A converter 16 will now be explained by referring to the flowchart in FIG. 5.

First, the collector voltage of the NPN transistor 32 is subjected to A/D conversion in the A/D converter 14 in step S11. Next, the initial value of the NPN transistor 32 stored at the time of assembling the camera at normal temperature is read from the EEPROM 88 in step S12.

Then, the amount of a change in $H_{FE}$ is computed from the difference between the values and the infinity decision level and the value of the light-amount inverse integration current are determined in steps S13 and S14. Then, its corresponding output of the D/A converter 16 is determined in step S15. As the infinity decision level and the value of the light-amount inverse integration current that cancel a change in $H_{FE}$ caused by the temperature are determined, the focusing operation is initiated in step S16.

The setting of the D/A converter at the time of driving motors will now be described in detail.

Figure 6A:
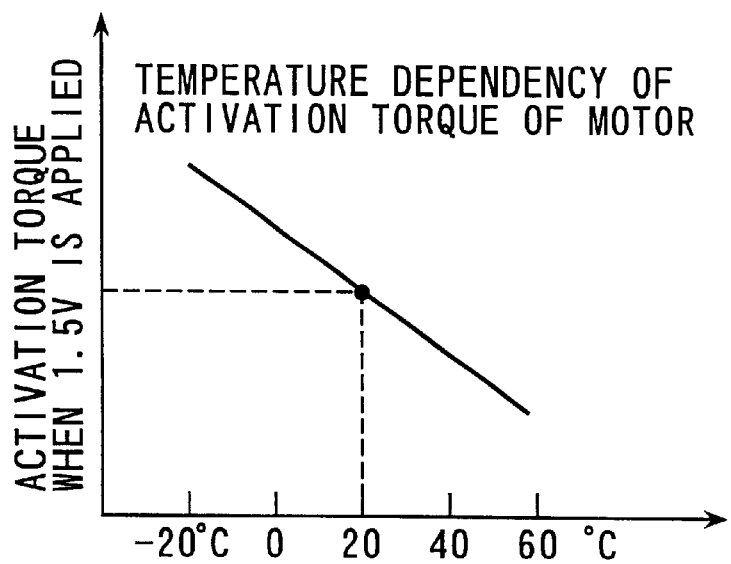
FIG. 6A is a characteristic diagram showing the temperature dependency of activation torque when a predetermined voltage is applied to a motor.

FIG. 6A is a characteristic diagram showing the temperature dependency of activation torque when a predetermined voltage is applied to the motor.

As the winding resistance is changed by the temperature, and the activation current is varied accordingly, so that the activation torque of the motor varies nearly in proportional to the variation. Therefore, an approximately constant activation torque is acquired by correcting the drive voltage, set at normal temperature, based on the temperature, thus suppressing a temperature-originated change in activation torque.

Figure 6B:
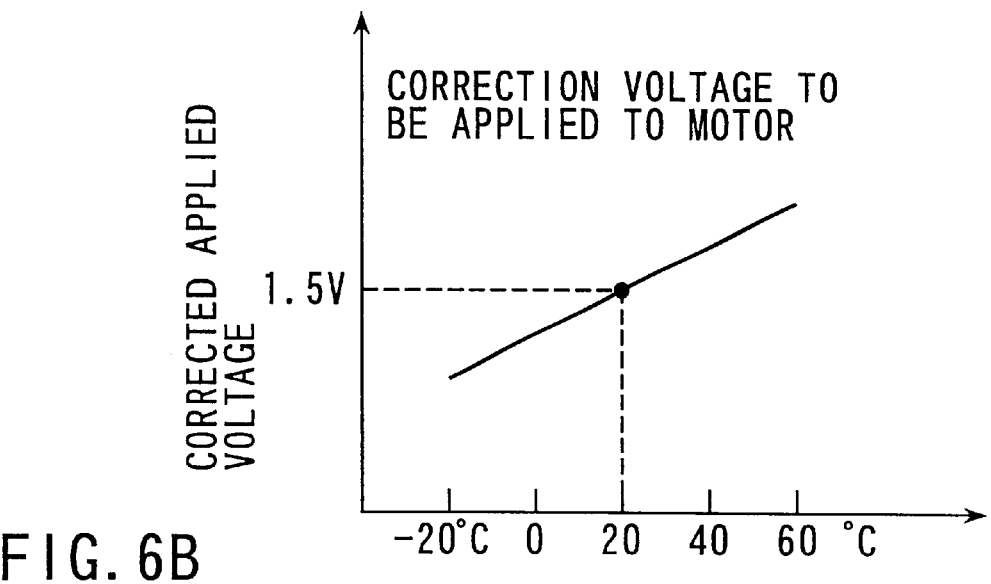
FIG. 6B is a temperature characteristic diagram of a correction voltage to be applied to the motor.

In this case, as shown in FIG. 6B, the applied voltage has only to be changed in the reverse direction to the characteristic of motor drive torque.

Figure 7:
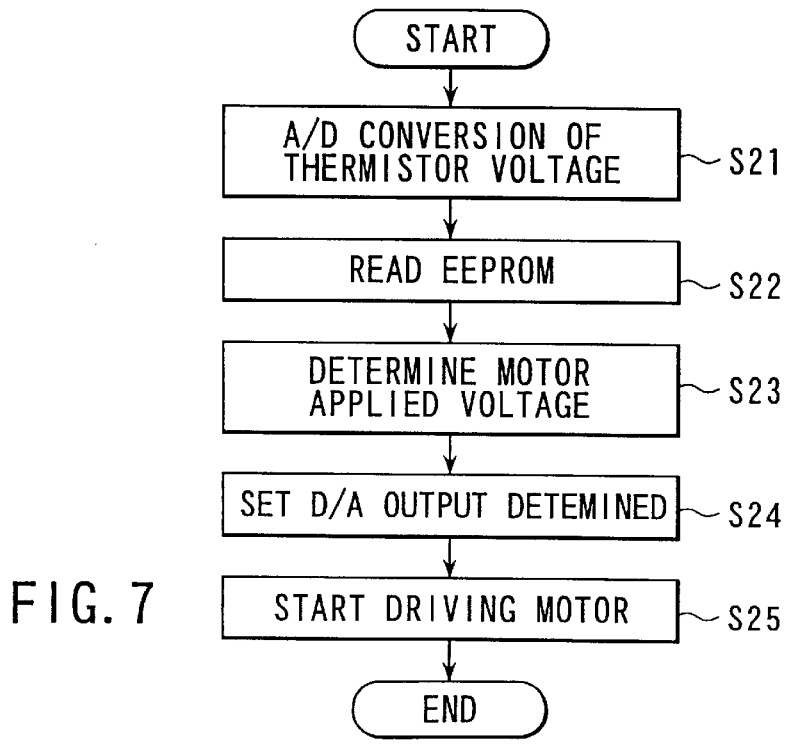
FIG. 7 is a flowchart for explaining the operation of the CPU 10 when the motor is driven.

FIG. 7 is a flowchart for explaining the operation of the CPU 10 when the motor is driven. Referring to this flowchart, the operation of the CPU 10 when the motor is driven will be discussed below.

First, the thermistor voltage is subjected to A/D conversion in step S21, and a voltage equivalent value to be applied is read from the EEPROM 88 based on the conversion in step S22. In step S23, the read value becomes a motor applied voltage value.

Thereafter, the output of the D/A converter 16 is set in step S24. Then, the motor driving is started in step S25.

Here, the value from the EEPROM 88 may be the value applied to the D/A converter itself. When there are multiple motor applied voltages and the amount of data is vast or the like, the D/A value may be computed using a correction value or correction coefficient with respect to a reference voltage to be applied.

A description will now be given of the setting of the output of the D/A converter when the blur sensor IC 84 is in operation.

Figure 8A:
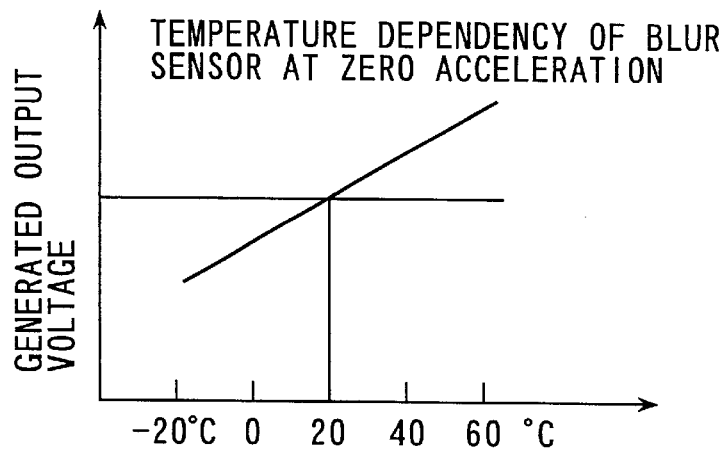
FIG. 8A is a characteristic diagram showing the temperature dependency of an output voltage when the acceleration of a shake sensor is zero.

FIG. 8A is a characteristic diagram showing the temperature dependency of an output voltage when the acceleration of the blur sensor is zero. In the case of the sensor having such a characteristic, a delay time to the point at which an operational point is followed up becomes shortened if the reference voltage value of the amplifier is set in accordance with the temperature.

Figure 8B:
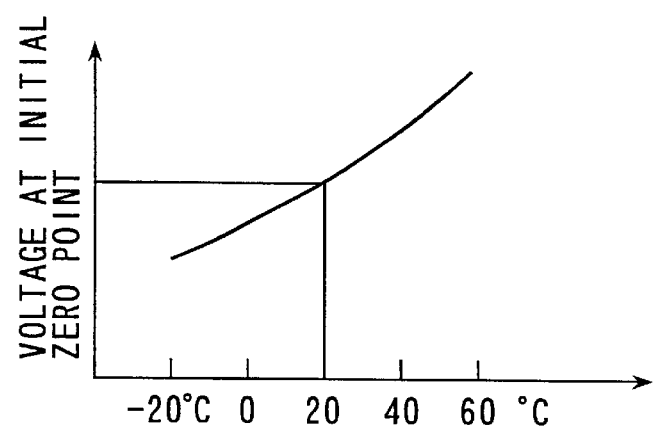
FIG. 8B is a temperature characteristic diagram of an amplification reference voltage for initialization.

The amplification reference voltage to be initialized is switched according to the temperature as shown in FIG. 8B.

Figure 9:
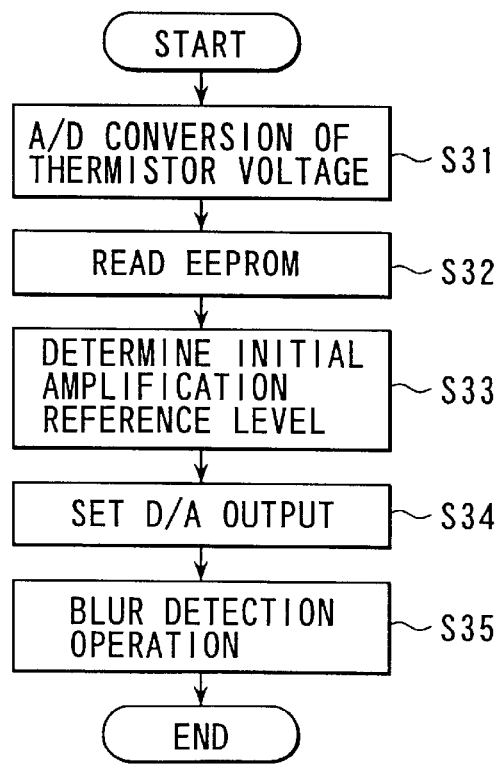
FIG. 9 is a flowchart for explaining the operation of the CPU 10 when a shake sensor IC 84 is in operation.

FIG. 9 is a flowchart for explaining the operation of the CPU 10 at the time of performing the aforementioned operation.

First, the thermistor voltage is subjected to A/D conversion in step S31. Then, a D/A set value equivalent to its corresponding set initial value is read from the EEPROM 88 in step S32, so that the initial amplification reference level is determined in step S33.

Next, the output value of the D/A converter 16 is set in step S34 based on the reference level. Thereafter, a blur detection operation is initiated in step S35.

According to the first embodiment, as apparent from the above, because the temperature dependency of the display density level of the LCD display unit 90 is corrected by the D/A converter 16 in the CPU 10, the temperature dependency of the LCD can be canceled easily. As voltage setting is not determined in the IFIC 20, data in the EEPROM 88 has only to be rewritten when an LCD with a different characteristic is to be used. This can eliminate the cost for making the correction by changing the mask of the IFIC 20.

As the temperature dependency of $H_{FE}$ of the AF circuit can be canceled, the performance can be maintained even at a low temperature or high temperature. Further, since the element in the IC (which is located in the same chip as, and which has the same shape as, the transistor to be compensated) is monitored directly, it is possible to make the correction more accurately than is done by simply using the temperature. Furthermore, because of the performance of the D/A converter 16 in the CPU 10, the circuit structure of the IFIC 20 becomes simpler, so that cost reduction can be achieved by the reduced chip area.

Further, as the temperature dependency of the motors is canceled, delicate control at the time of focus adjustment or the like can be performed accurately.

Even if motors or the like with different characteristics are used, it can be dealt merely with correction of data in the EEPROM, so that this invention can be adapted to many cameras at a fewer cost.

In addition, as the amplification reference voltage for initialization of the blur sensor can be optimized according to the temperature, a blur detection delay can be made smaller and accurate detection and correction can be done. If a blur sensor with a different characteristic is used, it can easily be coped with simply rewriting the EEPROM, thus ensuring application to many combinations at a low cost.

Note that in the first embodiment, with regard to the temperature detecting method, a temperature proportional voltage supply may be provided in the IC so that it is be detected, not a thermistor.

The temperature correction of the blur sensor is not limited to the amplification reference, but may compensate for other temperature dependencies, such as canceling the temperature dependency of the output that corresponds to the acceleration by changing the amplification factor.

Further, the item whose temperature dependency is to be canceled by the output of the D/A converter 16 of the CPU 10 may be other than those discussed above.

A second embodiment of this invention will now be described.

Figure 10:
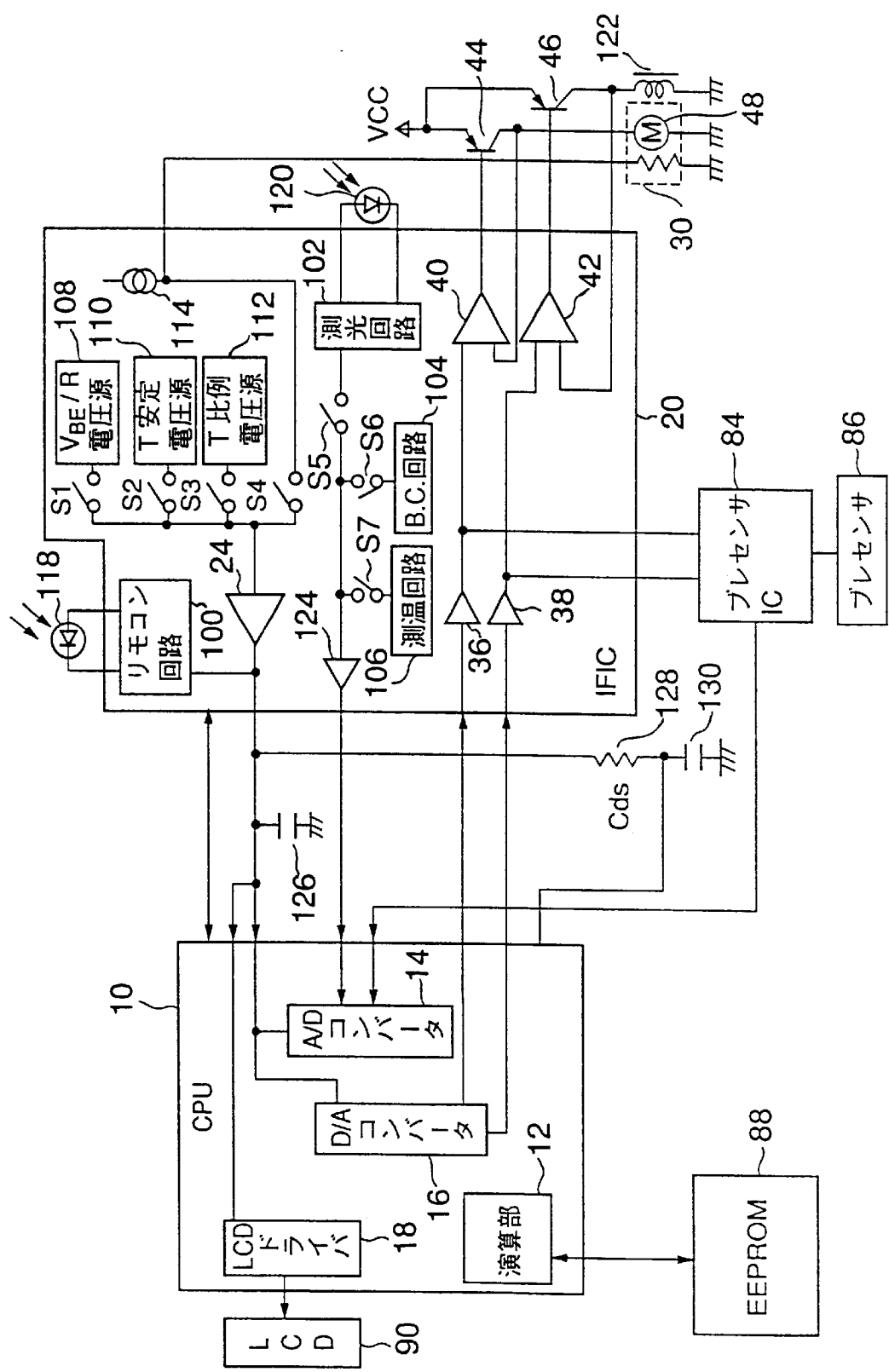
FIG. 10 is a structural diagram of an electric system of a camera, illustrating a second embodiment of this invention.

FIG. 10 is a structural diagram of an electric system of a camera, illustrating the second embodiment of this invention.

Only those portion of the second embodiment which differ from the first embodiment shown in FIG. 1 will be discussed, and the description of the other structures, which are the same as those of the first embodiment, will not be repeated.

In the CPU 10, the reference voltage of the A/D converter 14, the reference voltage of the D/A converter 16 and the drive reference voltage of the LCD driver 18 are connected by a common line, and are all supplied from one terminal of the IFIC 20.

The IFIC 20 does not include a focusing circuit. Instead, the IFIC 20 includes a remote control circuit 100, a light metering circuit 102, a battery checking circuit (BC circuit) 104 and a temperature measuring circuit 106.

Further, four types of voltage supplies, a $V_{BE}/R$ voltage supply 108, a T stable voltage supply 110 whose temperature dependency is nearly zero, a T proportional voltage supply 112 which supplied an output voltage proportional to the temperature, and a thermistor voltage supply by the voltage at one of the thermistor 30 to which a T stable current source 114 is connected to and which is connected to the ground (GND), are selectively connectable by switch elements S1 to S4.

The remote control circuit 100 is connected to a remote control sensor 118 via an external terminal. Likewise, the light metering circuit 102 is connected to a light metering sensor 120 for measuring a spot light via an external terminal. Further, the power of the remote control circuit 100 is given by the output of the buffer 24. The thermistor 30 is located, together with a solenoid 122, in the vicinity of the motor 48 via a member having a high thermal conductance.

Further, the light metering circuit 102, the battery check circuit 104 and the temperature measuring circuit 106 are connected to the A/D converter 14 via respective switching elements S5, S6 and S7 and a buffer 124.

A capacitor 126 for stabilization is connected between the output terminal of the buffer 24 and the GND. The light metering circuit that uses a light metering sensor (Cds) 128 for measuring average light is constructed in combination with a capacitor 130 and is connected to a port of the CPU 10.

FIG. 11 is a diagram showing selection of an original voltage supply for the output voltage of the buffer 24.

When no other operation takes place during LCD display, the display density approaches a constant if it is driven with a high voltage at a low temperature, the $V_{BE}/R$ type voltage supply is used. With regard to the remote control circuit 100, likewise, a $V_{BE}/R$ type voltage supply is used because the minimum operational voltage becomes higher at a low temperature due to the structure of the amplifier.

As this $V_{BE}/R$ voltage supply is not susceptible to the influence of a change in Vcc, it is suitable for the remote control circuit 100 which is likely to be affected by noise.

At the time the D/A converter 14 in the CPU 10 performs A/D conversion, the characteristic is switched according to the target to be subjected to A/D conversion.

First, when the output of the light metering circuit 102 in the IFIC 20 is processed, because of the presence of the temperature dependency of the compression diode in the circuit, the T proportional voltage supply is used to cancel it. The outputs of the temperature measuring circuit 106, the battery check circuit 104 and the shake sensor 86 are output to the A/D converter 14 in the CPU 10 without having a temperature dependency, the T stable voltage supply which can eliminate the temperature dependency is used.

When the motor is driven with a constant voltage, the thermistor voltage supply is used. This thermistor is so selected as to have a temperature dependency opposite to the temperature dependency of the activation torque of the motor 48. At the time the motor is driven, therefore, it is unnecessary to change the set value of the D/A converter 16 to match with the temperature by special means of compensation or the like, and predetermined data has only to be set in the D/A converter 16 at whatever temperature.

At the time of measuring light by the light metering sensor (Cds) 128, a temperature-originated variation in measured value is suppressed so that the T stable voltage supply is used. In the light metering method, measuring is carried out with a CR time constant and the time from the point at which the port is set to a low level once to set the charges of the capacitor 130 to zero, through the switching the port to the input, and to the point of crossing of the thresh is measured.

FIG. 12 is a diagram exemplarily illustrating the voltage of the T stable voltage supply, the voltage of the $V_{BE}/R$ voltage supply, the LCD display characteristic and the minimum voltage for operating the remote control circuit.

As shown in FIG. 12, when the T stable voltage supply is used, there appears an area in which an LCD display defect occurs, and the minimum voltage for the remote control is not sufficient. If it is replaced with the $V_{BE}/R$ voltage supply, however, both the LCD and remote control circuit can be driven well and adequately.

As the time of an operation in a mode which does not use the $V_{BE}/R$ voltage supply is short, the appearance of the LCD display is slightly degraded, which is hardly noticeable.

According to the second embodiment, most of the temperature dependency is compensated by providing the reference voltage to be applied to the D/A converter with the temperature dependency, so that computation in the CPU becomes simpler, thus requiring a smaller program capacity.

As the temperature of motors whose temperature-dependent changes are expected to be prominent is detected directly, it is possible to make the correction accurately as compared with the case where the environmental temperature is measured before correction.

Further, the reference voltage of the LCD driver 18 and the reference voltages of the D/A converter 16 and the A/D converter 14 are connected to a common line and are supplied from one terminal of the IFIC 20, so that the IC requires only a single output buffer and thus becomes compact. Further, fewer wires are needed on a printed circuit board on which the IC is mounted and a single capacitor is needed for stabilization. In addition, the aforementioned voltages are common and a voltage supply with a different temperature dependency is switched in accordance with the operation mode, so that it is possible to mainly reduce a temperature-originated problem.

Further, because it is unnecessary to supply the reference voltage of the LCD driver from the D/A converter 16 in the CPU 10, there are such advantages that an error becomes smaller even in an inexpensive structure whose output impedance is high and the display quality becomes higher.

Furthermore, as the reference voltage of the LCD driver 18 is matched with the type of the power supply of the remote control circuit 100, when the mode involves a long operation time (wait time for remote control: normally several minutes), the voltage suitable for the LCD driver can be maintained and the time for the inadequate voltage can be shortened.

Although the light metering circuit is eliminated in the second embodiment, this is not restrictive but the structure may be modified to include the light metering circuit.

It is possible to use not only the switching of the temperature characteristic of the reference voltage supply but also a method of compensating the temperature by detecting the temperature based on the output of the temperature measuring circuit 106 in the IC and changing the set value of the D/A converter 16 as in the first embodiment.

Although the constant voltage driving discussed is for driving the motors, the thermistor 30 may be located in the vicinity of the solenoid plunger via a member having a high thermal conductance, and the temperature dependency of the adsorbing force of this member may be compensated.

Although the temperature has been explained as an environmental parameter in the above-described embodiments, it is not restrictive. For example, a parameter, such as humidity, other than the temperature may of course be used.

In short, this invention can provide an electric circuit for a camera, which can perform stable camera control with a simple structure and without depending on a change in environment, such as temperature.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An electric circuit for a camera comprising:

a microcomputer including an A/D converter section, a D/A converter section and an operation control section;

at least one module operative in response to an instruction from said microcomputer and having a temperature dependency;

monitor means for outputting an analog signal corresponding to said temperature dependency of said at least one module; and storage means for storing a correlation between an operation of said at least one module and said analog signal, whereby said microcomputer sets data to be given to said D/A converter section in accordance with a value obtained by digital conversion of said analog signal by said A/D converter section and data stored in said storage means.

2. The electric circuit for a camera according to claim 1, wherein said at least one module comprises a sensor, an actuator and a display unit.

3. An electric circuit for a camera comprising:

a microcomputer including a D/A converter section capable of receiving a reference voltage from an external unit, and an operation control section;

a plurality of modules operative based on an instruction from said microcomputer and having a temperature dependency;

reference-voltage supply means for supplying reference voltages having a plurality of temperature characteristics to said D/A converter section in said microcomputer; and storage means for storing data on correlations between operations and temperature dependencies of said modules, whereby said microcomputer allows said reference-voltage supply means to supply a reference voltage having one of said temperature characteristics, in accordance with the data stored in said storage means, and generates a predetermined output signal using said reference voltage.

4. The electric circuit for a camera according to claim 3, wherein said plurality of modules comprise a sensor, an actuator and a display unit.

5. An electric circuit for a camera comprising:

a microcomputer including an A/D converter section, a D/A converter section and an operation control section; and a reference-voltage outputting circuit operative in response to an instruction from said microcomputer to supply a reference voltage to said A/D converter section and said D/A converter section via a single common signal line, whereby said microcomputer switches a temperature characteristic of said reference voltage between a case where said A/D converter section is used and a case where said D/A converter section is used.

6. An electric circuit for a camera comprising:

a microcomputer including an operation control section, an LCD driver for converting an externally supplied reference voltage to drive a liquid crystal panel, a D/A converter section operative in response to said externally supplied reference voltage and an output of said operation control section, and an A/D converter section operative in response to said externally supplied reference voltage and the output of said operation control section; and a reference-voltage outputting circuit for supplying a reference voltage to said LCD driver, said D/A converter section and said A/D converter section via a single common signal line.

7. An electric circuit for a camera comprising:

a microcomputer including an operation control section, an LCD driver for internally converting an externally supplied reference voltage to drive a liquid crystal panel and an A/D converter section operative in response to said externally supplied reference voltage; and a reference-voltage outputting circuit for supplying a reference voltage to said LCD driver and said A/D converter section via a single common signal line, whereby said microcomputer switches a temperature characteristic of said reference voltage between a case where said A/D converter section is operated and a case where said A/D converter section is not operated.

8. An electric circuit for a camera comprising:

a microcomputer including an operation control section, a D/A converter section operative based on an externally supplied reference voltage;

a remote control detection circuit for detecting a wireless remote control signal; and a reference-voltage outputting circuit for supplying a reference voltage for said D/A converter section and power for said remote control detection circuit via a single common signal line.

9. An electric circuit for a camera comprising:

a microcomputer including an operation control section and a D/A converter section;

a focusing circuit for generating an output having a temperature dependency; and a temperature measuring circuit, whereby said microcomputer sets an output of said D/A converter section in response to said temperature measuring circuit to thereby compensate for said temperature dependency of said focusing circuit.

10. An electric circuit for a camera comprising:

a blur sensor for detecting a blur state of said camera;

an amplifier for amplifying a signal from said blur sensor;

a microcomputer including an operation control section and a D/A converter section; and a reference-voltage outputting circuit for supplying a reference voltage via a common signal line to two or more of a voltage control circuit for controlling a drive voltage of an actuator of said camera based on an output of said D/A converter section, a blur detecting circuit for setting a reference level of said amplifier based on said output of said D/A converter section and a focusing circuit for setting an analog signal level to be used in a predetermined circuit in accordance with said output of said D/A converter section, whereby said microcomputer controls two or more of said voltage control circuit, said blur detecting circuit and said focusing circuit in a time-divisional manner.

11. An electric circuit for a camera comprising:

a microcomputer including an A/D converter section, a D/A converter section and an operation control section;

at least one module operative in response to an instruction from said microcomputer and having an environmental parameter dependency;

monitor means for outputting an analog signal corresponding to said environmental parameter dependency of said at least one module; and storage means for storing a correlation between an operation of said at least one module and said analog signal, whereby said microcomputer sets data to be given to said D/A converter section in accordance with a value obtained by digital conversion of said analog signal by said A/D converter section and data stored in said storage means.

* * * * *